United States Patent
Ishibashi et al.

(10) Patent No.: US 6,573,018 B2
(45) Date of Patent: Jun. 3, 2003

(54) SURFACE-TREATED METALLIC-OXIDE FINE POWDER, AND ITS PRODUCTION AND USE

(75) Inventors: Naruyasu Ishibashi, Yokkaichi (JP); Eiji Komai, Yokkaichi (JP); Ralph M. Brandes, Yokkaichi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 0 days.

(21) Appl. No.: 09/821,622

(22) Filed: Mar. 29, 2001

(65) Prior Publication Data

US 2002/0004026 A1 Jan. 10, 2002

(30) Foreign Application Priority Data

Mar. 31, 2000 (JP) ........................................ 2000-098466

(51) Int. Cl.⁷ ............................................... G03G 9/113
(52) U.S. Cl. ................................. 430/108.2; 430/111.4; 428/400 C
(58) Field of Search ........................... 430/108.2, 111.4; 428/400

(56) References Cited

U.S. PATENT DOCUMENTS

| | | | | |
|---|---|---|---|---|
| 4,618,556 A | * | 10/1986 | Takenouchi | 430/110 |
| 6,077,640 A | * | 6/2000 | Komai et al. | 431/110 |

FOREIGN PATENT DOCUMENTS

| | | |
|---|---|---|
| JP | 58-185405 | 10/1983 |
| JP | 62-052561 | 3/1987 |
| JP | 63-155155 | 6/1988 |
| JP | 08-220791 | 8/1996 |
| JP | 10-326028 | 12/1998 |

* cited by examiner

*Primary Examiner*—John Goodrow
(74) *Attorney, Agent, or Firm*—Dennis G. LaPointe; Marson Law, P.A.

(57) ABSTRACT

The tribo-electro static charge is stabilized by treating the surface of the metallic-oxide fine powders such as a silica powder, using the mixed solution which consists of a specific silane coupling agent containing primary amino group, other silane coupling agent containing amino group and the hydrophobic agent The powder such as silica has the small charge variation with time, and is suitable as the additive of the powder coatings or the electrophotographic toner.

8 Claims, No Drawings

SURFACE-TREATED METALLIC-OXIDE FINE POWDER, AND ITS PRODUCTION AND USE

BACKGROUND OF THE INVENTION

1. Field of the Invention

This invention relates to the surface-treated metallic-oxide fine powder, which has good flow ability and excellent stability against agitation time, and especially relates to a surface-treated silica fine powder. More specifically, this invention relates to the surface-treated metallic-oxide fine powder which improves the stability against agitation time, its production method, and an electrophotographic toner using the same, regarding the surface-treated silica fine powder etc., which is added in a powder coating, an electrophotographic toner, etc., in order to improve the flow ability, to prevent aggregation or to adjust charge, etc.

2. Prior Art

The surface-treated metallic-oxide fine powder, in which the surface of metallic-oxide fine powder, such as silica, titania, and alumina, is treated with organic materials, is widely used as the flow ability improving agent of the electrophotographic toner for a copying machine, a laser beam printer, and a plain-paper facsimile. In such applications, the tribo-electro static charge to an iron powder and an iron oxide powder as a carrier is one of the important quality factors. Wherein, although the metallic-oxide powder which has negative charge in the tribo-electro static charge is general, the metallic-oxide powder which is controlled to positive charge is also known.

In the charge of the metallic-oxide fine powder, for example, a metallic-oxide powder having positive charge or zero charge, which is introduced with the amino group and the hydrophobic group, is disclosed in Japanese Patent Laid Open No.62-185405. In addition, a method is shown in Japanese Patent Laid Open No.63-52561 in which the silica synthesized by a vapor phase method is treated with a silane containing epoxy groups and subsequently with the amines. Moreover, the metallic-oxide powder, which was heated with the modified silicone oil containing epoxy groups, and treated with an organic compound containing amino group, is shown in Japanese Patent Laid Open No. 63-155155.

Problems to be Solved

However, while these conventional metallic-oxide powders, especially silica powder, can control early time tribo-electro static charge, the stability with time is inferior. That is, there is a problem that the charge varies much as agitation time becomes longer. As a method for solving this problem, addition of titanium oxide to the toner is proposed in Japanese Patent Laid Open No. 8-220791. Moreover, the method of adding alumina to the toner is proposed in Japanese Patent Laid Open No. 9-150382. However, compared with silica powder, titanium-oxide powder and alumina powder are inferior in the effectiveness for improving the toner flow ability.

The present invention solves the above-mentioned conventional problems, and provides the surface-treated metallic-oxide fine powder having excellent stability against agitation time as well as good flow ability. According to this invention, the metallic-oxide fine powder, especially silica fine powder, which has excellent stability against agitation time is obtained. For example, a surface-treated powder is obtained in which the difference between the amounts of charge for 1 minute and 5 minutes is less than 200 $\mu C/g$, or the ratio of said amounts is less than 2.5.

Means to Solve Problems

The surface-treated metallic-oxide fine powder of the present invention controls the charge of the metallic-oxide fine powder and improves the stability by suppressing the variation of the amount of charge with time by surface-treating with two silane coupling agents containing amino group, one of which is for controlling the charge and the other is for increasing the charge stability, and the hydrophobic agent and introducing plural kinds of amino groups and hydrophobic groups to the surface of the metallic-oxide fine powder.

That is, this invention relates to the surface-treated metallic-oxide fine powder which comprises the following formulations and its production method or use.

1. A surface-treated metallic-oxide fine powder satisfying at least one of the relational expressions of the following formula 1 or 2, in which the amount of tribo-electro static charge to iron powders is shown:

$$|Q1-Q5|<200 \, \mu C/g \quad \text{(formula 1)}$$

$$Q1/Q5<2.5 \quad \text{(formula 2)}$$

wherein Q1 is the amount of tribo-electro static charge at 1 minute after the agitation of the iron powder and the metallicoxide fine powders, and Q5 is the amount of tribo-electro static charge at 5 minutes after.

2. A hydrophobic surface-treated metallic-oxide fine powder, wherein the tribo-electro static charge is stabilized by surface-treating of the metallic-oxide fine powder, using the silane coupling agent containing primary amino group shown by the following formula 3, and at least one of silane coupling agent containing amino group chosen from silane coupling agents containing amino group shown by the following formula 4, and the hydrophobic agent $$XnR_{(3-n)}Si—(CH_2)m—NH_2 \quad \text{(formula 3)}$$

wherein X is the functional group which can be hydrolyzed, R is the hydrogen group or the alkyl group, n is an integer from 1 to 3, m is an integer from 1 to 6.

$$XnR_{(a-n)}Si—(CH_2)m-NR1R2 \quad \text{(formula 4)}$$

wherein X and R are the same as above mentioned ones, R1 and R2 are hydrogen groups, alkyl groups, or aryl groups, and the part of said groups can be replaced by oxygen, nitrogen, or sulfur atom except the case of R1=R2=H, n is an integer from 1 to 3 and m is an integer from 1 to 6.

3. A surface-treated metallic-oxide fine powder according to above 1, which has the tribo-electro static charge satisfying at least one of the relational expressions shown in above-mentioned formula 1 and 2, by surface-treating the metallic-oxide fine powder using the silane coupling agent containing primary amino group shown by above-mentioned formula 3, at least one of silane coupling agent containing amino group chosen from the silane coupling agent containing amino groups shown by above-mentioned formula 4, and the hydrophobic agent.

4. A surface-treated metallic-oxide fine powder according to above 2, wherein the addition of the silane coupling agent containing primary amino group of group of above-mentioned formula 3, is 0.1–20% by weight, and the addition of the silane coupling agent containing the amino group of above-mentioned formula 4, is 0.1–20% by weight, and the addition of the hydrophobic agent is 5–50% by weight.

5. A surface-treated metallic-oxide fine powder according to above 2, 3 or 4, wherein the hydrophobic agent is an alkyl silazane compound, an alkylalkoxy-silane compound, a chloro-silane compound, a silicone varnish containing reactive functional groups, a non-reactive silicone varnish, a silicone oil containing reactive functional groups, or a non-reactive silicone oil, and the degree of hydrophobicity by the permeability method is 70% or more.

6. A surface-treated metallic-oxide fine powder according to above 1 or 2, wherein said metallic-oxide fine powder is the silica fine powder which generated by the flame hydrolysis of a volatile silicon compound having BET specific surface area less than 400 m$^2$/g.

7. A production method of the surface-treated metallic-oxide fine powder, wherein the silane coupling agent containing primary amino group shown by above-mentioned formula 3, the silane coupling agent containing amino group shown by above-mentioned formula 4, and the hydrophobic agent, are sprayed to the metallic-oxide fine powder to be heated, or said metallic-oxide fine powder is heated after dipped in the mixed solutions of these agents.

8. A toner containing the surface-treated silica fine powder according to above 1, 2 or 3.

Embodiment of the Invention

Hereafter, this invention is concretely explained based on examples.

As the surface-treated metallic-oxide fine powder of the present invention, especially as the silica fine powder, so-called humed silica can be used efficiently, which has the specific surface area (by nitrogen adsorption-process or BET process) of less than 400 m$^2$/g and was made by flame hydrolysis of a volatile silicon compound such as a silicon halide compound. For example, as such kind of silica powder, AEROSIL50, 90 G, 130, 200, 300, 380, 380 S, TT600, OX50 can be used, which are the product names of NIPPON AEROSIL Co., Ltd. and on the market.

Hereafter, the surface-treated metallic-oxide fine powder of the present invention is explained, taking a silica fine powder as an example. In addition, alumina powder and titanium oxide powder can be explained in the same way.

The surface-treated silica powder of this invention stabilizes the tribo-electro static charge by surface-treating, using the silane coupling agent containing the primary amino group shown by the following formula 3, and at least one of the silane coupling agents containing amino group chosen from the silane coupling agents containing the amino group shown by the formula 4, and hydrophobic agent.

XnR$_{(3-n)}$Si–(CH$_2$)$m$–NH$_2$ (Formula 3)

XnR$_{(3-n)}$Si–(CH$_2$)$m$–NR1R2 (Formula 4)

Here, X is the functional group which can be hydrolyzed, R is the hydrogen group or the alkyl group, and R1 and R2 are the hydrogen group, the alkyl group, or the aryl group except the case of R1=R2=H. In addition, the part of R1 and R2 can be replaced by nitrogen, oxygen or sulfur atom. n is an integer from 1 to 3, and m is an integer from 1 to 6. The hydrolysis groups represented by X, are specifically a chloro group, an alkoxy group, an acetoxy group, a hydroxy group, etc.

The silane coupling agent containing primary amino group shown by the above formula 3 mainly controls the charge and the following compounds are mentioned as specific examples. Although γ-amino propyltrimethoxysilane, or γ-amino propyltriethoxy-silane is preferable from the point of reactivity and kinds of sub-products, it is not limited to these compounds.

(MeO)$_3$SiCH$_2$CH$_2$CH$_2$NH$_2$
(EtO)$_3$SiCH$_2$CH$_2$CH$_2$NH$_2$
(i—PrO)$_3$SiCH$_2$CH$_2$CH$_2$NH$_2$
(EtO)$_3$SiCH$_2$NH$_2$
Cl$_3$SiCH$_2$CH$_2$CH$_2$NH$_2$
(MeO)$_2$MeSiCh$_2$CH$_2$Ch$_2$NH$_2$
(EtO)$_2$MeSiCH$_2$CH$_2$CH$_2$NH$_2$

The above-mentioned silane coupling agent containing amino group shown by above formula 4 mainly improves the charge stability, and although the following compounds are mentioned as specific examples, it is not limited to these compounds.

(MeO)$_3$SiCH$_2$CH$_2$CH$_2$NHEt
(MeO)$_3$SiCH$_2$CH$_2$CH$_2$NHBu
(MeO)$_3$SiCH$_2$CH$_2$CH$_2$NEt$_2$
(MeO)$_3$SiCH$_2$CH$_2$CH$_2$NBu$_2$
(MeO)$_3$SiCH$_2$CH$_2$CH$_2$NHCH$_2$CH$_2$NH$_2$
(EtO)$_3$SiCH$_2$CH$_2$CH$_2$NHCH$_2$CH$_2$NH$_2$
(MeO)$_3$SiCH$_2$CH$_2$CH$_2$NHC$_6$H$_5$
(MeO)$_2$MeSiCH$_2$CH$_2$CH$_2$NHCH$_2$CH$_2$NH$_2$
Cl$_3$SiCH$_2$CH$_2$CH$_2$NHEt
(AcO)$_3$SiCH$_2$CH$_2$CH$_2$NHEt
(AcO)$_2$MeSiCH$_2$CH$_2$CH$_2$NHCH$_2$CH$_2$NH$_2$
(MeO)$_3$SiCH$_2$CH$_2$CH$_2$NHCH$_2$CH$_2$OMe

Although the addition amount of the silane coupling agent containing primary amino group of formula 3 is adjusted according to the specific surface area of the silica fine powder, 0.1–20 weight part is generally desirable to 100 weight part of the silica fine powder. Moreover, with respect to the addition amount of the silane coupling agent of formula 4, 0.1 to 20 weight part is desirable to 100 weight part of the silica fine powder. When these amounts are under 0.1 weight parts, the controlling of the charge of the silica fine powder is not sufficient since there are few amounts of amino group introduced onto the surface of the silica fine powder, and good stability of the charge cannot be obtained. On the other hand, when the amounts are more than 20 weight part, the silica fine powder itself becomes to show the hydrophilicity since the amino group is a hydrophilic functional group, and thus the hydrophobicity required as a toner additive cannot be obtained.

As the hydrophobic agent used for this invention, any materials of the following can be used if they are general ones: the alkyl silazane compounds such as hexamethyldisilazane, the alkylalkoxy-silane compounds such as dimethylmethoxy-silane, dimethylethoxy-silane, trimethylmethoxy-silane, methyltrimethoxy-silane, and butyltrimethoxy-silane, the chloro-silane compounds such as dimethyldichloro-silane and trimethylchloro-silane, the silicone varnish containing reactive functional groups, the non-reactive silicone varnish, the silicone oil containing reactive functional group, the non-reactive silicone oil, etc. In addition, in order to obtain high hydrophobicity, it is desirable to use hexamethyldisilazane or the silicone oil. Moreover, in the case of the silicone oil, it is desirable that the viscosity is less than 1000 cst. If the viscosity is 1000 cst or more, it is difficult to apply the surface-treated agent uniformly on the silica fine powder, and the aggregation of the silica fine powder may occur to give the bad influence on the tribo-electro static charge of the silica fine powder.

The above-mentioned hydrophobic agents are not limited specifically if they are general ones. In addition, hexamethyldisilazane or dimethylsiloxane is desirable in order to obtain high hydrophobicity. Although the addition amount of the hydrophobic agent is adjusted according to the specific surface area of the silica fine powder and the addition amount of the silane coupling agent containing amino group, the amount of 5–50 weight part of silane coupling agent containing amino group is desirable in general. If this amount is less than 5 weight part, high hydrophobicity cannot be obtained, on the other hand, even if the amount is more than 50 weight part, hydrophobicity is practically equal and the aggregation may rather increase, so that it is not desirable.

It is possible to use the general method to treat the silica fine powder by these surface-treated agents. Specifically, the silica fine powder is charged into a container having a stirring equipment represented by a Henschel mixer etc., and is stirred under nitrogen atmosphere. The silane coupling agent containing primary amino group of the general formula 3, the silane coupling agent containing amino group of the general formula 4, and the hydrophobic agent, are added to the stirred powder to be mixed uniformly, or these surface-treated agents are sprayed to the silica powder to be mixed uniformly. The addition order of the silane coupling agents of formula 3 and formula 4 is not limited.

After mixing these surface-treated agents and silica powder uniformly, they are heated for more than 30 minutes at a temperature of less than 300° C. When the heating temperature is 300° C. or higher, it is not desirable since the amino group introduced for controlling charge is heat decomposed, and it may cause the poor tribo-electro static charge and the coloring of the silica fine powder itself, etc.

With the above-mentioned surface-treatment, the hydrophobic surface-treated silica powder can be obtained, which improves the charge control and stability. Specifically, a silica powder can be obtained wherein the tribo-electro static charge to iron powders satisfies at least one of the relational expressions shown in the following formula 1 or 2:

$$|Q1-Q5|<200 \ \mu C/g \qquad \text{formula 1}$$

$$Q1/Q5<2.5 \qquad \text{formula 2}$$

wherein Q1 is the tribo-electro static charge of the agitation of the iron and the fine silica powders at 1 minute after, and Q5 is the tribo-electro static charge at 5 minutes after. Since the variation of the tribo-electro static charge with time is small, the surface-treated metallic-oxide fine powder of this invention is suitable for the additive of the powder coatings or the electrophotographic toner.

EXAMPLES

Hereafter, this invention is illustrated by examples.

Example 1

While the silica powder synthesized by a vapor phase method (NIHON AEROSIL product; Aerosil 200) of 200 m²/g by BET specific surface area, was put into a reaction vessel and stirred under nitrogen atmosphere, the mixed solution comprising 5 g of γ-aminopropyltriethoxy-silane (Shin-Etsu Chemical Co., Ltd. product: KBE 903), N-(β-amino ethyl)-γ-aminopropyltrimethoxy-silane (Shin-Etsu Chemical Co., Ltd product: KBM603), and 15 g of the dimethyl-silicone oil (Shin-Etsu Chemical Co., Ltd. product: KF 96) was sprayed to 100 g of said silica powder. The sprayed powder was heated while being stirred for 60 minutes at 200° C., and then cooled to prepare the surface-treated silica fine powder A.

Examples 2 to 7

Each mixed solution, which consists of the silica powder synthesized by vapor pahse method having the specific surface areas shown in Table 1, the silane coupling agent containing primary amino group shown by the formula 3, the silane coupling agent containing amino group shown by the formula 4, and the hydrophobic agent, was used to prepare the surface-treated silica fine powders B to G by the same process as in Example 1 under the heating conditions shown in Table 1.

Comparative examples 1 to 3

Each mixed solution, consisting of the silica powder synthesized by vapor phase method having the specific surface areas shown in Table 1, the silane coupling agent containing amino group shown by either of formula 3 or 4, and the hydrophobic agent, was used to be prepared the surface-treated silica fine powders H to J by the same process as in Example 1 under the heating conditions shown in Table 1.

0.1 g of this surface-treated silica powder and 50 g of iron powder were put into a glass-vessel to be mixed, and after agitation for the predetermined time (1 minute and 5 minutes) by Turbula Mixer, 0.1 g of this mixed powder was extracted. The tribo-electro static charge was measured after the nitrogen blowing was performed for 1 minute by the blow-off charge measuring apparatus (TOSHIBA CHEMICAL Co., LTD. product: TB-200). The result is shown in Table 2. As shown in Table 2, in each silica powder A to G of the present invention, |Q1–Q5|, which is the difference of the charges within 5 minutes after the mixing with iron powder, is less than 200 μC/g, or the ratio of the charge Q1/Q5 is less than 2.5. On the other hand, in the silica powder H of the comparative example, the ratio of the charge is large although the difference of the charge is small, that is, the stability of the charge with time is inferior. Moreover, in the silica powder I of the comparative example, although the difference of the charges is not so large, the ratio of the charge is large. In the silica powder J of the comparative example, the difference of the charge is extremely large.

TABLE 1

| | Kinds | Specific Surface Area of Silica | Compound of Formula 3 Addition Amount | Compound of Formula 4 Addition Amount | Hydrophobic Agent Addition Amount | Heat-Treatment ° C. | Minutes |
|---|---|---|---|---|---|---|---|
| Example | | | | | | | |
| 1 | A | 200 | (KBE903) 5 g | (KBM603) 5 g | Dimethyl-Silicon Oil 15 g | 200 | 60 |
| 2 | B | 380 | (KBE903) 15 g | KBM603) 12 g | Dimethyl-Silicon Oil | 200 | 60 |

TABLE 1-continued

| | Kinds | Specific Surface Area of Silica | Compound of Formula 3 Addition Amount | Compound of Formula 4 Addition Amount | Hydrophobic Agent Addition Amount | Heat-Treatment °C. | Heat-Treatment Minutes |
|---|---|---|---|---|---|---|---|
| 3 | C | 200 | (KBE903) 2 g | (KBM603) 3 g | 40 g Hexamethyl-Disilazane | 200 | 60 |
| 4 | D | 200 | (KBE903) 2 g | (KBM603) 3 g | 25 g Dimethyl-Silicon Oil | 150 | 60 |
| 5 | E | 200 | (KBE903) 5 g | (KBM602) 5 g | 15 g Dimethyl-Silicon Oil | 150 | 60 |
| 6 | F | 200 | (KBE903) 2 g | (KBM573) 6 g | 15 g Dimethyl-Silicon Oil | 150 | 60 |
| 7 | G | 50 | (KBE903) 1 g | (KBM603) 1.5 g | 20 g Dimethyl-Silicon Oil | 150 | 60 |
| Comparative Example | | | | | | | |
| 1 | H | 200 | (KBE903) 5 g | — | 5 g Dimethyl-Silicon Oil 15 g | 200 | 60 |
| 2 | I | 200 | — | (KBM603) 5 g | Hexamethyl-Disilazane 17 g | 200 | 60 |
| 3 | J | 200 | — | (KBM573) 6 g | Hexamethyl-Disilazane 10 g | 200 | 60 |

Addition Amount is the amount to 100 g of Silica Powder
KBE903: γ-amonopropyl-triethoxy-silane
KBM603: N-(β-aminoethyl)-γ-aminopropyl-trimethoxy-silane
KBM602: N-(β-aminoethyl)-γ-aminopropyl-methyldimethoxy-silane
KBM573: N-phenyl-γ-aminopropyl-trimethoxy-silane Table 2

| | | Degree of Hydrophobicity (%) | Q1 (μC/g) | Q5 (μC/g) | \|Q1 − Q5\| | Q1/Q5 |
|---|---|---|---|---|---|---|
| Example | A | 83 | +680 | +280 | 460 | 2.4 |
| | B | 71 | +1050 | +620 | 430 | 1.7 |
| | C | 87 | +370 | +180 | 190 | 2.1 |
| | D | 78 | +560 | +230 | 330 | 2.4 |
| | E | 72 | +770 | +450 | 320 | 1.7 |
| | F | 85 | +150 | −15 | 165 | −10.0 |
| | G | 83 | +530 | +260 | 270 | 2.0 |
| Comparative | H | 86 | +310 | +90 | 220 | 3.4 |
| Example | I | 60 | −470 | −150 | 320 | 3.1 |
| | J | 67 | −1150 | −400 | 750 | 2.9 |

Q1 is the amount of tribo-electro static charge at 1 minute after mixing.
Q5 is the amount of tribo-electro static charge at 5 minutes after mixing.
|Q1 − Q5| is the difference.
Q1/Q5 is the rate.

Effectiveness of the Invention

According to the present invention, metallic-oxide fine powders such as silica with the small charge variation with time are provided. The powder such as silica has the small charge variation with time, and is suitable as the additive of the powder coatings or the electrophotographic toner.

What is claimed is:

1. A surface-treated metallic-oxide fine powder satisfying at least one of the relational expressions of the following formula 1 or 2, in which the amount of tribo-electro static charge to iron powders is shown:

|Q1−Q5|<200 μC/g  (formula 1)

Q1/Q5<2.5  (formula 2)

wherein Q1 is the amount of tribo-electro static charge at 1 minute after the agitation of iron powders and metallic-oxide fine powders, and Q5 is the amount of tribo-electro static charge at 5 minutes after, wherein the metallic-oxide fine powders are selected from the group consisting of silica, alumina and titanium oxide.

2. A hydrophobic surface-treated metallic-oxide fine powder, wherein the tribo-electro static charge is stabilized, by surface-treating the metallic-oxide fine powder, which is selected from the group consisting of silica, alumina and titanium oxide, using a silane coupling agent containing primary amino group shown by following formula 3, at least one of silane coupling agents containing amino group, chosen from the silane coupling agents containing amino group shown by following formula 4, and a hydrophobic agent:

XnR$_{(3-n)}$Si—(CH$_2$)$m$-NH$_2$  (formula 3)

wherein X is a functional group which can be hydrolyzed, R is hydrogen groups or alkyl groups, n is an integer of 1 to 3, and m is an integer of 1 to 6

XnR$_{(3-n)}$Si—(CH$_2$)$m$-R1R2  (formula 4)

wherein X and R are the same as above mentioned ones, R1 and R2 are hydrogen groups, alkyl groups, or aryl groups, and the part of said groups can be replaced by oxygen, nitrogen, or sulfur atom except the case of R1=R2=H, n is an integer from 1 to 3 and m is an integer from 1 to 6.

3. A surface-treated metallic-oxide fine powder according to claim 1, wherein said powder has the tribo-electro static charge which satisfies at least one of the relational expressions shown by above-mentioned formula 1 or 2, by surface-treating said metallic-oxide fine powder, using the silane coupling agent containing primary amino group shown by above mentioned formula 3, at least one of silane coupling agents containing amino groups chosen from silane coupling agents containing amino groups shown by above-mentioned formula 4, and a hydrophobic agent.

4. A surface-treated metallic-oxide fine powder according to claim 2, wherein an addition of a silane coupling agent containing primary amino group of above-mentioned formula 3, is from 0.1 to 20% by weight, an addition of the silane coupling agent containing amino group of above-mentioned formula 4 is from 0.1 to 20% by weight, and an addition of a hydrophobic agent is from 5 to 50% by weight.

5. A surface-treated metallic-oxide fine powder according to claim 2, 3, or 4, wherein, a hydrophobic agent is an alkyl silazane compound, an alkyl alkoxy silane compound, a chloro-silane compound, a silicone varnish containing reactive functional groups, a non-reactive silicone varnish, a silicone oil containing reactive functional groups, or a non-reactive silicone oil, and the degree of hydrophobicity by a permeability method is 70% or more.

6. A surface-treated metallic-oxide fine powder according to claim 1 or 2, wherein, said metallic-oxide fine powder is a silica fine powder which is generated by the flame hydrolysis of a volatile silicon compound and is less than 400 $m^2$/g by BET specific surface area.

7. A production method of a surface-treated metallic-oxide fine powder, wherein a silane coupling agent containing primary amino group shown by above-mentioned formula 3, a silane coupling agent containing amino group shown by above-mentioned formula 4, and a hydrophobic agent, are sprayed to the metallic-oxide fine powder selected from the group consisting of silica, alumina and titanium oxide and heated, or said metallic-oxide fine powder is heated after dipped in mixed solution of these agents.

8. A toner containing a surface-treated silica fine powder according to claim 1, 2 or 3.

* * * * *

UNITED STATES PATENT AND TRADEMARK OFFICE
CERTIFICATE OF CORRECTION

PATENT NO.     : 6,573,018 B2
DATED          : June 3, 2003
INVENTOR(S)    : Naruyasu Ishibashi et al.

It is certified that error appears in the above-identified patent and that said Letters Patent is hereby corrected as shown below:

<u>Column 8,</u>
Line 58, replace "$X_nR_{(3-n)}Si-(CH_2)_m-R_1R_2$ (formula 4)" with -- $X_nR_{(3-n)}Si-(CH_2)_m-NR_1R_2$ (formula 4) --.

Signed and Sealed this

Twelfth Day of August, 2003

JAMES E. ROGAN
*Director of the United States Patent and Trademark Office*